United States Patent
Baumann

[11] 3,808,921
[45] May 7, 1974

[54] CUTTING MACHINE FOR CUTTING FLAT MATERIALS

[76] Inventor: Wilfried Baumann, Bredenweg 134a, 4801 Hoberge-Uerentrup, Germany

[22] Filed: Apr. 17, 1972

[21] Appl. No.: 244,386

[30] Foreign Application Priority Data
Apr. 15, 1971 Germany.............................. 2118162

[52] U.S. Cl....................... 83/155, 83/266, 83/416, 83/532, 83/648, 198/195
[51] Int. Cl............................ B26d 7/06, B26d 7/20
[58] Field of Search ............ 83/155, 218, 266, 416, 83/561, 532, 533, 648; 198/195

[56] References Cited
UNITED STATES PATENTS

| | | | |
|---|---|---|---|
| 1,434,888 | 11/1922 | Guardino.............................. | 83/266 |
| 2,569,545 | 10/1951 | Tatosian ............................... | 83/155 |
| 2,839,138 | 6/1958 | Wilhelm................................ | 83/264 |
| 2,692,020 | 10/1954 | Oberhardt........................ | 83/533 X |
| 1,625,026 | 4/1927 | Holmes................................ | 83/532 X |

Primary Examiner—J. M. Meister
Attorney, Agent, or Firm—Larson, Taylor and Hinds

[57] ABSTRACT

Cutting machine for cutting flat materials and comprising a punch and a feed conveyor. The conveyer consists of a plurality of plate members pivotally connected to each other by hinges. The hinges having bolts the prolongated ends of which are guided in guiding means at least during their travel through the punch. A pair of disks are provided on each end of the conveyer. The hinge bolts engage recesses on the peripherie of the disks during return travel of the conveyer. Driving means are arraged on the feed end of the conveyer to provide thrust action thereon. A magnetic brake is arranged on the output end of the conveyer to counteract the thrust action. At least to centering cones are positioned on one end surface of each plate member to engage corresponding recesses on the other end surfaces of the plate members for securing exact alignment of the plate members during their travel in the strands of the conveyer.

11 Claims, 6 Drawing Figures

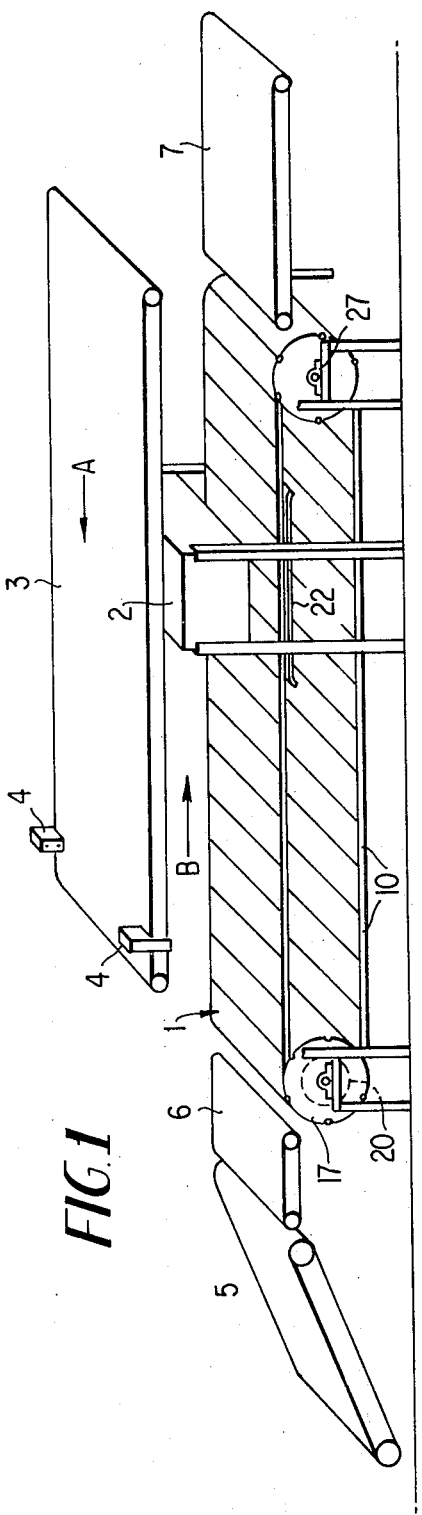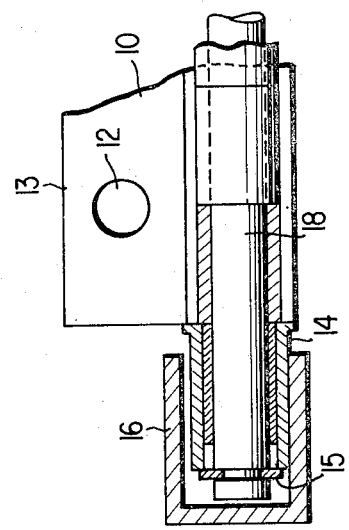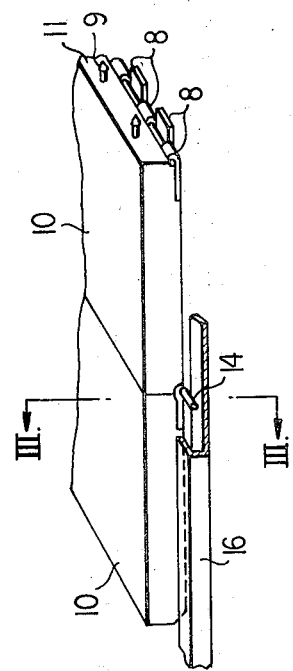

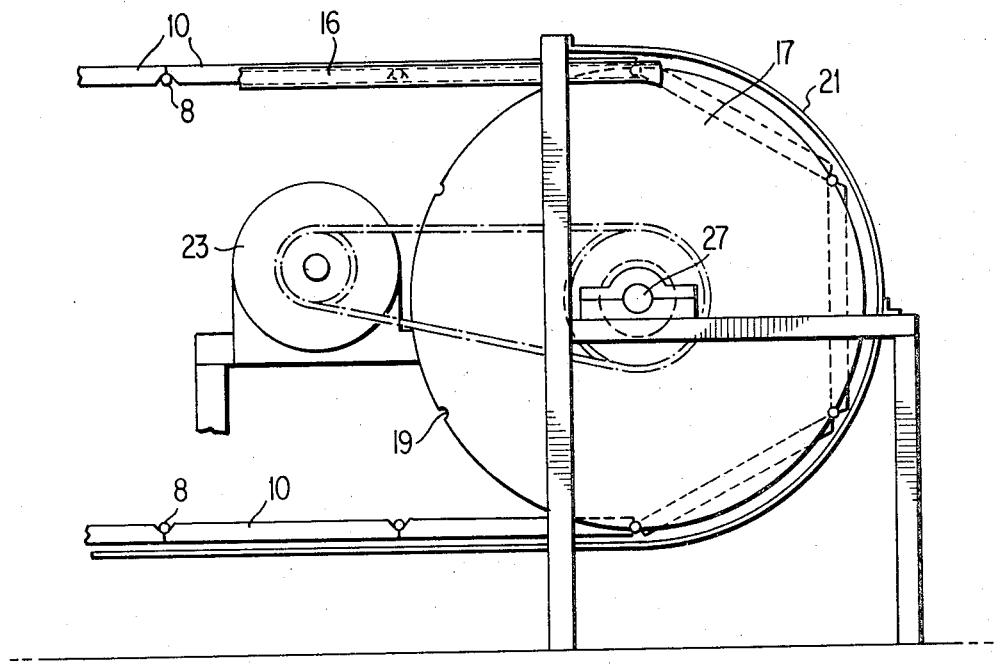
FIG.4
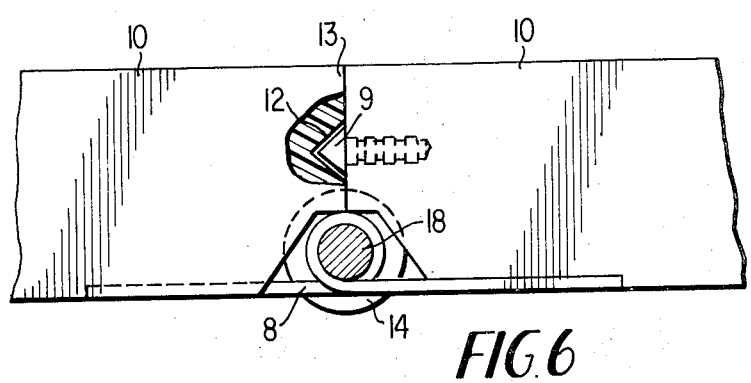
FIG.5
FIG.6

CUTTING MACHINE FOR CUTTING FLAT MATERIALS

BACKGROUND OF THE INVENTION

The present invention relates to a cutting machine for cutting flat materials. More particularly, the invention relates to a cutting machine comprising a conveyer and a punch to which the materials are transported by the conveyer in a flat position.

On known machines of this kind the conveyer consists of a band of rubber or rubber like materials which after relatively short time becomes damaged. Besides the fact that the following punch cuts will easely become less precise, the conveyer band after prolonged use also stretches and needs readjustment. Through this again the existing cuts on the conveyer band spread out and the lack of precision again increases. Though normally a layer of paper is used at the bottom of the materials when mixed materials or such are to be punched the pressure of the punch in order to achieve perfect performance must necessarily be so strong that often not only the paper will be cut as mentioned above the surface of the band will be damaged. A precise calculation of the punch stroke is hardly to be made because of the elastic properties of the different materials.

Cutting maching feeding through a conveyer are highly preferable in comparison to cutting machines working on fixed support plates because the layers of materials can be fed to the punch without stress and also the cutting tools can be applied before the materials reach the punch, i.e., during the previous punch is processed.

SUMMARY OF THE INVENTION

The present invention is intended to provide a cutting machine consisting of a conveyer and a punch completely encompassing the advantages of conveyer feeding but eleminating the risk of continuously and simultaneously damaging the punch support.

In accordance with the invention the conveyer consists of rigid plate members pivotally connected to each other and guided by side rails. The advantage of such a conveyer consisting of rigid plates is the fact that the punch cut can be precisely calculated in relation to pressure and length of the stroke of the punch since all flexibilities or yieldings are practically eliminated. Therefore, when paper is used as lowest layer it is hardly possible to damage the individual plates.

As an other very important feature of the invention the means of the front return of the conveyer are coupled with the means of drive in such a way that during operation the conveyer plates are under thrust action. This prevents the development of gaps between successive plate members which could disturb the cut in these plates even if only by fractions of inches. The reason for this to happen is that the conveyer under thrust leaves the plates close together thereby ensuring precise and complete separation of the individual layers of materials. As mentioned before it is important that if the bottom layer is paper it is impossible to prevent a precise separation even of the lowest layer.

As another feature of the invention the material of the plates preferably is a plastic one. According to the special demands plastic materials with a special degree of hardness may be used. There is also a possibility to use a plastic rigid but tough on the surface. It is understood that steel plates could possibly be used which are coated by plastic.

The invention will be better understood by reference to the drawings and to the detailed description which follows.

BRIEF DESCRIPTION OF THE DRAWINGS

FIG. 1 is a perspective schematic view of a cutting machine being constructed in accordance with the invention;

FIG. 2 is an enlarged perspective view of two successive plate members partly broken away;

FIG. 3 is a cross-sectional view of one end of a hinge between to successive plate members;

FIG. 4 is an elevational view of the output end of the conveyer in a larger scale;

FIG. 5 is a side elevational view of one end of a guide rail in still a larger scale; and FIG. 6 is a side elevational and partly sectional view of the hinge connection of two plate members partly broken away.

DETAILED DESCRIPTION OF THE INVENTION

With reference to the drawings, the cutting machine shown comprises a conveyer 1 of the plate type and a punch 2 which is only schematically depicted as being well known in the art. A return conveyer 3 for returning the cutting tools is arranged above the plate conveyer and may be provided with limit switches 4 or a light barrier.

Feed conveyers 5 and 6 are provided on the feed end of the plate conveyer 1 and an outlet conveyer 7 may be provided on the other end thereof as shown in FIG. 1. The material to be punched or cutted is fed to the punch 2 in direction of arrow B.

According to the invention, the plate conveyer 1 comprises a plurality of rigid plate members 10 each extending across the total width of the conveyer and pivotally connected to each other by hinges 8, FIG. 2. Each plate member 10 is provided on its leading end surface with at least two centering cones 9, FIGS. 2 and 6, projecting into corresponding recesses 12 provided on the trailing end surface 13 of each plate member 10. Thus, it is guaranteed that the surfaces of successive plates are exactly aligned when these plates are in a position in the upper or lower strand of the conveyer.

Each hinge 8 has a hinge bolt 18 extending beyond the width of the conveyer 1 on each side thereof and furnished on each end with a roller 14 secured by a spring ring 15. The rollers 14 are received in U-shaped guide rails 16 thus guiding the plate members 10 during there travel in the upper strand of the conveyer 1. This lateral guidance or side guiding is important, particularly, because the plate members 10 in this portion of the travel path should be under thrust action.

Means for returning of the conveyer plates on each end of the conveyer comprise two pairs of disks 17 each pair mounted in spaced relationship on a shaft 26 and 27, respectively, which is supported by bearings 28 on bearing pedestals 29. Disks 17 are provided on its periphery with conjugating recesses 19 in which the ends of the hinge bolts 18 are received during its travel around the shafts 26, 27 on the ends of the conveyer 1 thus guiding the plate members exactly. It is quite obvious that for this purpose the distance between two successive recesses on each disk 17 will correspond to the distance between two successive hinge bolts 18 on the conveyer. As schematically shown in FIG. 1, shaft 26 may be rotated by an electrical motor 24 via a gear 20 including a frictional coupling not shown. Thus the upper strand of the conveyer is subjected to a thrust action.

To avoid escaping of the hinge bolts 18 out of the recesses 19 arcuate guide plates 21, FIG. 4, may be provided encompassing the periphery of each disk 17 and thus maintaining the hinge bolts 18 within the recesses 19 during the return phase of their travel. In FIG. 4, guide plate 21 is depicted in a larger radial distance from the periphery of the disk 17 for better understanding of the drawing. Is is obvious that the guide plate 21 are covering the outside surface of the travel path of the hinge bolts 18 immediately. Well guided by the guide plates 21, the hinge bolts 18 will, on the end of the return travel around the front disks 17, directly enter into the U-shaped guide rails 16 the front ends 16' of which may be widened to V-form as shown in FIG. 5 to facilitate entering of the bolts 18. It is not important whether the guide plates 17 are prolongated along the lower strand of the conveyer 1 as shown in FIG. 4, or whether additional guide rails (not shown) are provided to guide the hinge bolts 17 during their travel along the lower strand of the conveyer. It is only important that the upper strand of the conveyer 1 is well guided by guide rails against arching or rising out of the plain under strong thrust action.

A supporting or backing plate 22 may be provided below the upper strand of the conveyer 1 in the region of punch 2 the distance between the supporting or backing plate 22 and the upper strand of the conveyer being about 0.04 in. to 0.08 in. If plate 22 is made of abrasive resitant material, the plate members alternatively may be closely arranged above the upper surface of plate 22 providing smooth sliding on the said surface and thus preventing elastic yielding under pressure of the punch 2.

As mentioned above plate members 10 are moved by thrust action during their travel along the upper strand of conveyer 1 this thrust action being generated by the motor 24 via a frictional coupling. As shown in FIG. 4, shaft 27 on the output end of conveyer 1 is provided with an magnetic brake 23 which for drive is connected to shaft 27 by a belt transmission 28. Magnetic brake 23 may also be used as an impulse generator for controlling punch 2 in a suitable manner. Further, magnetic brake 23 counteracts the thrust action on the upper strand of the conveyer 1 and provides close contact between the successive plate members 10 thus eliminating any risk of distortion or movement during punch operation.

It is evident that the scope of the invention is in no way limited by the example shown and descriped above. Thus the means for guiding the plate members may be of other construction as well as the plate members themselves may be constructed in another manner. It is an substantial feature of the invention, however, that the conveyer is constructed and guided in such manner that any undisired flexibility and yielding under action of the punch is eliminated to avoid damage of the conveyer surface on which the material to be punched is lying during operation.

Based upon the foregoing description of the invention, what I claim and desire to be protected by Letters Patent is:

1. A cutting machine for cutting flat materials, the said machine comprising a conveyer extending in substantially horizontal direction and comprising a plurality of plate members pivotally connected to each other, a punch arranged above the said conveyer to vertically act against the materials to be cut and lying on the upper strand of the conveyer, a driving means for rotating the said conveyer in an predetermined direction in which the materials to be cut may be fed to the said punch, said driving means being arranged on the feeding end of the said conveyer thereby subjecting the said plate members in the upper strand of the said conveyer to a thrust action, lateral guide means for guiding the said plate members on their longitudinal sides at least during travel on the upper strand of the said conveyer to prevent arching or rising out of plane and a magnetic brake rotationally connected to the said shaft on the output end of the said conveyer to counter act the thrust action on the upper strand of the said conveyer.

2. A cutting machine in accordance with claim 1 wherein the said plate members laterally extend over the total width of the said conveyer and are connedted to each other by hinges.

3. A cutting machine in accordance with claim 2 wherein the said hinges are positioned on the underside of the said plate members in a countersunk position.

4. A cutting machine in accordance with claim 2 wherein each of the said hinges has a hinge bolt extending beyond the width of the said conveyer on each side thereof the said hinge bolts being provided an each end with a roller, and the said guide means being longitudinally extending guide rails by which the said rollers are guided at least during their travel in the upper strand of the conveyer.

5. A cutting machine in accordance with claim 4 wherein the said guide rails have U-shaped cross section.

6. A cutting machine in accordance with claim 4 wherein guide plates are provided to cover the travel path of the rollers on the outside beyond the region of the said guide rails, the said guide plates being arranged in the region of the return of the said conveyer and arcuated.

7. A cutting machine in accordance with claim 4 wherein a pair of disks is provided on each end of the said conveyer, the said disks of each pair being arranged in spaced relationship on a shaft and the said disks being further provided on their periphery with conjugating recesses in which the ends of the said hinge bolts are received during their travel around the said shafts.

8. A cutting machine in accordance with claim 1 wherein the said driving means comprises a frictional coupling coupled to the said shaft on the feed end of the said conveyer.

9. A cutting machine in accordance with claim 1 wherein one end surface of each plate member is provided with at least two centering cones engaging corresponding recesses in the other end surfaces of each plate member to provide exact alignment of successive plate members during their travel in the stands of the conveyer.

10. A cutting machine in accordance with claim 1 wherein a supporting or backing plate is arranged under the upper strand of the conveyer in the region of the said punch to provide a support for the said plate members during cutting operation.

11. A cutting machine in accordance with claim 1 wherein an additional conveyer is positioned in parallel and space relationship the said plate conveyer to provide returning of the cutting tools to be used after cutting operation.

* * * * *